United States Patent
Tsuchida

(10) Patent No.: US 9,567,501 B2
(45) Date of Patent: Feb. 14, 2017

(54) SILICONE PRESSURE-SENSITIVE ADHESIVE COMPOSITION HAVING IMPROVED SUBSTRATE ADHESION AND PRESSURE-SENSITIVE ADHESIVE ARTICLE

(71) Applicant: SHIN-ETSU CHEMICAL CO., LTD., Tokyo (JP)

(72) Inventor: Osamu Tsuchida, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/619,358

(22) Filed: Feb. 11, 2015

(65) Prior Publication Data

US 2015/0240141 A1  Aug. 27, 2015

(30) Foreign Application Priority Data

Feb. 27, 2014 (JP) ................. 2014-036872
Jun. 18, 2014 (JP) ................. 2014-125456

(51) Int. Cl.
| | |
|---|---|
| *C08G 77/08* | (2006.01) |
| *C09J 183/04* | (2006.01) |
| *C09J 183/14* | (2006.01) |
| *C08L 83/04* | (2006.01) |
| *C08G 77/12* | (2006.01) |
| *C08G 77/20* | (2006.01) |
| *C08G 77/48* | (2006.01) |

(52) U.S. Cl.
CPC ............ *C09J 183/04* (2013.01); *C09J 183/14* (2013.01); *C08G 77/12* (2013.01); *C08G 77/20* (2013.01); *C08G 77/48* (2013.01); *C08L 83/04* (2013.01); *Y10T 428/2852* (2015.01)

(58) Field of Classification Search
CPC .......... C08L 83/04; C08J 183/04; C08G 77/04
See application file for complete search history.

(56) References Cited

U.S. PATENT DOCUMENTS

| | | | | |
|---|---|---|---|---|
| 4,983,701 A | * | 1/1991 | Hara ............... | C08L 83/04 528/15 |
| 5,405,896 A | * | 4/1995 | Fujiki ............... | C07F 7/0896 524/265 |
| 5,814,703 A | | 9/1998 | Yamaya et al. | |
| 8,916,646 B2 | * | 12/2014 | Kato ............... | C09J 183/06 524/492 |
| 8,937,123 B2 | * | 1/2015 | Kato ............... | C09J 183/04 524/106 |
| 2003/0236380 A1 | | 12/2003 | Fehn et al. | |
| 2005/0042462 A1 | | 2/2005 | Fehn et al. | |
| 2005/0213926 A1 | * | 9/2005 | Tabei ............... | H01L 23/296 385/147 |
| 2010/0210794 A1 | | 8/2010 | Frese et al. | |
| 2012/0232219 A1 | * | 9/2012 | Kato ............... | C08L 83/04 524/862 |

FOREIGN PATENT DOCUMENTS

| | | |
|---|---|---|
| CA | 2 244 601 A1 | 2/2000 |
| JP | 6-39584 B2 | 5/1994 |
| JP | 7-3215 A | 1/1995 |
| JP | 3232004 B2 | 11/2001 |
| JP | 3324166 B2 | 9/2002 |
| JP | 2003-105089 A | 4/2003 |
| JP | 2010-500462 A | 1/2010 |
| JP | 2012-149240 A | 8/2012 |
| WO | WO 03/029375 A1 | 4/2003 |
| WO | WO 2008/019953 A1 | 2/2008 |
| WO | WO 2012/091167 A2 | 7/2012 |

OTHER PUBLICATIONS

Extended European Search Report issued Apr. 29, 2015, in European Patent Application No. 15155752.7.

* cited by examiner

*Primary Examiner* — Margaret Moore

(74) *Attorney, Agent, or Firm* — Birch, Stewart, Kolasch & Birch, LLP

(57) ABSTRACT

A silicone pressure-sensitive adhesive composition is provided comprising (A) an organopolysiloxane having at least two alkenyl-containing organic groups, (B) a polyorganosiloxane comprising $R^2{}_3SiO_{1/2}$ and $SiO_{4/2}$ units in a molar ratio of 0.5 to 1.0, (C) a polyorganohydrogensiloxane containing at least three Si—H groups, (D) a platinum group metal base catalyst, and (E) an adhesion promoting compound containing at least one recurring unit of formula (3) and at least one Si—H group.

7 Claims, No Drawings

SILICONE PRESSURE-SENSITIVE ADHESIVE COMPOSITION HAVING IMPROVED SUBSTRATE ADHESION AND PRESSURE-SENSITIVE ADHESIVE ARTICLE

CROSS-REFERENCE TO RELATED APPLICATION

This non-provisional application claims priority under 35 U.S.C. §119(a) on Patent Application Nos. 2014-036872 and 2014-125456 filed in Japan on Feb. 27, 2014 and Jun. 18, 2014, respectively, the entire contents of which are hereby incorporated by reference.

TECHNICAL FIELD

This invention relates to a pressure-sensitive adhesive composition having improved substrate adhesion, and a pressure-sensitive adhesive article.

BACKGROUND ART

Pressure-sensitive adhesives (PSAs) constitute one group of adhesives and are often used in the form of PSA tape, PSA label or the like obtained by coating PSA onto a substrate and curing. Such tapes and labels are typical of PSA articles familiar in everyday life. These articles are used as labels for identification, for packing of things, for binding a plurality of parts, and in many other applications.

Several base materials are known for PSAs and generally classified into rubber, acrylic, and silicone bases. Rubber base PSAs are general-purpose base materials which are known from the past, and frequently used as general-purpose tape and other products because of low price. Acrylic base PSAs are based on polyacrylates and have better chemical properties than the rubber base PSAs, and are applicable to higher performance PSA products. Silicone base PSAs are composed of high viscosity silicone gum and silicone resin wherein a multiplicity of siloxane bonds are contained in the backbone. Thus the silicone PSAs have a variety of excellent characteristics such as heat resistance, freeze resistance, weather resistance, chemical resistance and electric insulation.

By virtue of such excellent characteristics, the silicone PSAs are used as industrial high-performance tapes including heat resistant tape, masking tape, and flame retardant mica tape. They are often used in a rigorous environment since they exert their own characteristics even under severe service conditions. Recently the demand for silicone PSAs is expanding. This is accounted for by a rapid enlargement of the market of products having touch panels (or screens) mounted such as smartphones and tablet computers. Since touch panels are typically operated by directly touching with human fingers, a screen protective film is attached to the surface of a touch panel on use, for protecting the display from smear and flaw. The screen protective film includes a PSA layer which is mostly made of silicone PSA. This application is due to the characteristics of silicone PSAs including good wetting to adherends and ease of reworking.

The substrate for the screen protective film is typically plastic film. Among others, PET and other polyester films having transparency are used. However, the plastic films are said to be less adherent to PSAs than paper substrates. This is presumably because plastic films have a flat surface and weaken the anchoring effect of PSA biting into the substrate as compared with paper substrates having microscopic irregularities. Poor adhesion may raise problems, for example, back transfer upon winding in roll form, and that the PSA layer is left on the adherend when the PSA film is peeled from the adherend after the lapse of an ample time from the attachment of PSA to the adherend.

From the past, several measures were taken to improve adhesion. Typical measures are by using more adherent substrates, and treating substrates with corona discharge. Also primer treatment is on widespread use. Primers for silicone PSAs are developed as disclosed in Patent Documents 1 to 3. While the primer treatment is quite effective for improving adhesion, its serious drawback is the addition of an extra coating step which is deleterious to the cost and productivity. One effective measure is to add an adhesion-promoting component to silicone PSA, whereby adhesion is established by a single coating step. Although such additives are known from Patent Documents 4 to 6, there is still a need for further improvement in adhesion. Patent Document 7 describes an additive which provides selective adhesion to organic resins. This additive is added to silicone rubber compositions. Patent Document 7 refers nowhere to silicone PSAs.

CITATION LIST

Patent Document 1: JP-B H06-39584
Patent Document 2: JP-A H07-3215
Patent Document 3: JP-A 2012-149240
Patent Document 4: JP-A 2003-105089
Patent Document 5: JP 3232004
Patent Document 6: JP-A 2010-500462 (WO 2008019953)
Patent Document 7: JP 3324166 (U.S. Pat. No. 5,405,896)

DISCLOSURE OF INVENTION

An object of the invention is to provide a silicone PSA composition having improved substrate adhesion via a single coating step and a PSA article.

The inventor has found that a silicone PSA composition having improved substrate adhesion is obtained by adding an adhesion-promoting component of specific structure.

In one aspect, the invention provides a silicone pressure-sensitive adhesive composition comprising (A) 100 to 40 parts by weight of an organopolysiloxane represented by the average compositional formula (1) and having at least two alkenyl-containing organic groups per molecule,

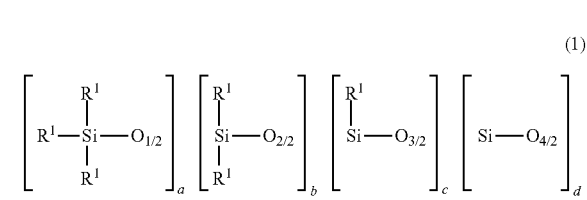

wherein $R^1$ is each independently a $C_1$-$C_{10}$ monovalent hydrocarbon group, at least two of $R^1$ containing a $C_2$-$C_{10}$ alkenyl-containing organic group, a is an integer of at least 2, b is an integer of at least 1, c is an integer of at least 0, d is an integer of at least 0, and $50 \le a+b+c+d \le 15{,}000$, (B) 60 to 0 part by weight of a polyorganosiloxane comprising $R^2{}_3SiO_{1/2}$ units and $SiO_{4/2}$ units wherein $R^2$ is each independently a $C_1$-$C_{10}$ monovalent hydrocarbon group free of aliphatic unsaturation or a $C_2$-$C_6$ alkenyl group, in a molar ratio $R^2{}_3SiO_{1/2}/SiO_{4/2}$ of 0.5 to 1.0, wherein the total amount of components (A) and (B) is 100 parts by weight, (C) a polyorganohydrogensiloxane represented by the average compositional formula (2) and containing at least three Si—H groups per molecule, in an amount to provide 0.2 to 15 moles of Si—H groups per mole of alkenyl groups in components (A) and (B), $$R^3{}_eH_fSiO_{(4-e-f)/2} \qquad (2)$$

wherein $R^3$ is each independently a substituted or unsubstituted $C_1$-$C_{10}$ monovalent hydrocarbon group, e and f are numbers in the range: e>0, f>0, and 0<e+f≤3, (D) a platinum group metal base catalyst for curing by promoting hydrosilylation addition between alkenyl groups in components (A) and (B) and Si—H groups in component (C), in an amount to give 1 to 500 ppm of metal based on the total weight of components (A) to (C), and (E) 0.01 to 10 parts by weight relative to the total weight of components (A) to (C) of a compound containing at least one recurring unit having the formula (3) and at least one Si—H group per molecule,

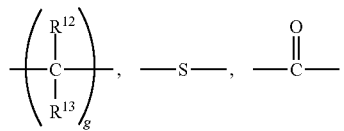

wherein $R^4$ to $R^{11}$ are each independently hydrogen, halogen, hydroxyl or a $C_1$-$C_6$ monovalent hydrocarbon group, X is selected from divalent organic groups having the formula (4):

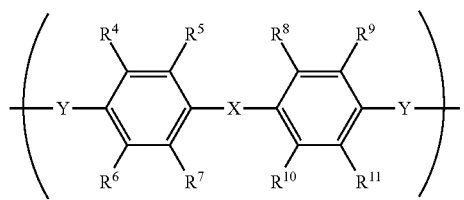

wherein $R^{12}$ and $R^{13}$ are each independently hydrogen, halogen, hydroxyl or a $C_1$-$C_6$ monovalent hydrocarbon group, and g is an integer of at least 1, and Y is each independently a $C_1$-$C_6$ divalent hydrocarbon group which may contain an ether moiety in its structure.

In another aspect, the invention provides a pressure-sensitive adhesive article comprising a substrate and a pressure-sensitive adhesive layer on at least one surface of the substrate, the pressure-sensitive adhesive layer being formed by coating the silicone pressure-sensitive adhesive composition defined above onto at least one surface of the substrate and curing the composition.

Advantageous Effects of Invention

When the silicone PSA composition is coated onto a substrate, a PSA article characterized by improved adhesion to the substrate is obtained.

DESCRIPTION OF PREFERRED EMBODIMENTS

As used herein, the notation (Cn-Cm) means a group containing from n to m carbon atoms per group. In the chemical formulae, Me stands for methyl, Vi for vinyl, and Ph for phenyl. The acronym "PSA" stands for pressure-sensitive adhesive. The term "substrate adhesion" refers to the adhesion of a PSA composition to a substrate.

Component A

Component (A) is an organopolysiloxane represented by the average compositional formula (1) and having at least two alkenyl-containing organic groups per molecule.

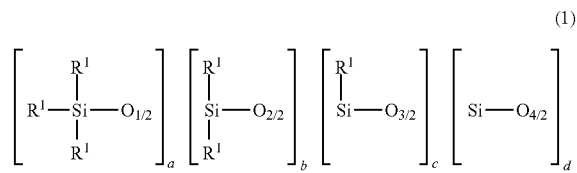

Herein $R^1$ is each independently a $C_1$-$C_{10}$ monovalent hydrocarbon group, at least two of $R^1$ contain a $C_2$-$C_{10}$ alkenyl-containing organic group, a is an integer of at least 2, b is an integer of at least 1, c is an integer of at least 0, d is an integer of at least 0, and 50≤a+b+c+d≤15,000.

$R^1$ which may be the same or different is a $C_1$-$C_{10}$ monovalent hydrocarbon group, and at least two of $R^1$ contain a $C_2$-$C_{10}$ alkenyl-containing organic group. Suitable monovalent hydrocarbon groups include alkyl groups such as methyl, ethyl, propyl and butyl, cycloalkyl groups such as cyclohexyl, and aryl groups such as phenyl. Also included are substituted forms of the foregoing groups in which some or all carbon-bonded hydrogen atoms are substituted by halogen atoms or other radicals, with suitable substituted groups including trifluoromethyl and 3,3,3-trifluoropropyl. Among others, saturated aliphatic groups and aromatic groups are preferable, with methyl and phenyl being most preferred.

The alkenyl-containing organic groups are preferably those of 2 to 10 carbon atoms, for example, alkenyl groups such as vinyl, allyl, hexenyl and octenyl, acryloylalkyl groups such as acryloylpropyl, acryloylmethyl, and methacryloylpropyl, cycloalkenylalkyl groups such as methacryloylalkyl and cyclohexenylethyl, and alkenyloxyalkyl groups such as vinyloxypropyl. Inter alia, vinyl is most preferred.

The content of alkenyl groups in component (A) is preferably 0.005 to 0.08 mole, more preferably 0.008 to 0.06 mole of alkenyl per 100 g of the organopolysiloxane.

The subscript a is an integer of at least 2, b is an integer of at least 1, c is an integer of at least 0, d is an integer of at least 0, and 50≤a+b+c+d≤15,000, preferably 200≤a+b+c+d≤12,000. If the sum a+b+c+d is less than 50, reactivity may lower due to too much crosslinking points. If the sum a+b+c+d exceeds 15,000, the organopolysiloxane may have an extremely high viscosity so that the composition may become difficult to agitate and mix and inefficient to work.

Component (A) is generally prepared by ring-opening polymerization of a cyclic low-molecular-weight siloxane such as octamethylcyclotetrasiloxane in the presence of a catalyst. Since the polymerization product contains the reactant, cyclic low-molecular-weight siloxane, it is preferably purified by heating under reduced pressure while passing an inert gas into the product, for distilling off the cyclic siloxane.

Preferred examples of component (A) include those of the following general formulae, but are not limited thereto.

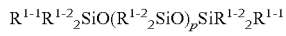

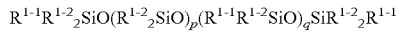

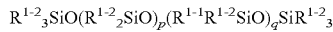

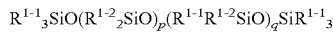

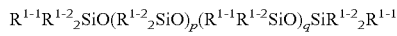

Herein $R^{1-1}$ is each independently an alkenyl-containing organic group, $R^{1-2}$ is each independently a $C_1$-$C_{10}$ monovalent hydrocarbon group, p and q are numbers in the range: p≥50 and q≥1, with the proviso that q≥2 where no $R^{1-1}$ is contained in the molecule, but $(R^{1-1}R^{1-2}SiO)_q$.

Examples of $R^{1-1}$ and $R^{1-2}$ are as exemplified above for $R^1$. Preferably p and q are numbers in the range: 50≤p≤15,000, and 1≤q≤1,000, and more preferably 2≤q≤1,000.

More illustrative examples of component (A) include those of the following general formulae, but are not limited thereto.

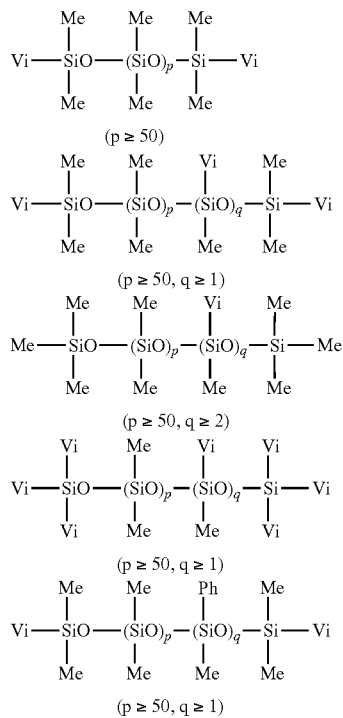

Component B

Component (B) is a polyorganosiloxane comprising $R^2{}_3SiO_{1/2}$ units and $SiO_{4/2}$ units wherein $R^2$ is each independently a $C_1$-$C_{10}$ monovalent hydrocarbon group free of aliphatic unsaturation or a $C_2$-$C_6$ alkenyl group wherein a molar ratio of $R^2{}_3SiO_{1/2}$ units to $SiO_{4/2}$ units ranges from 0.5/1 to 1.0/1. If the molar ratio of $R^2{}_3SiO_{1/2}/SiO_{4/2}$ is less than 0.5, there may be a drop of bonding force or tack. If the molar ratio exceeds 1.0, there may be a drop of bonding or retaining force. The molar ratio is preferably from 0.6 to 0.9, more preferably from 0.65 to 0.9.

$R^2$ which may be the same or different is a $C_1$-$C_{10}$ monovalent hydrocarbon group free of aliphatic unsaturation or a $C_2$-$C_6$ alkenyl group. Preferred $C_1$-$C_{10}$ monovalent hydrocarbon groups include $C_2$-$C_6$ alkyl groups such as methyl, ethyl, propyl and butyl, and $C_6$-$C_{10}$ aryl groups such as phenyl and tolyl. Preferred $C_2$-$C_6$ alkenyl groups include vinyl, allyl and butenyl.

In addition to $R^2$, component (B) may contain a silanol group and/or a hydrolyzable alkoxy group or phenoxy group, preferably in an amount of 0.01 to 4.0%, more preferably 0.05 to 3.5% by weight based on the total weight of component (B). If the content of silanol or alkoxy group is less than 0.01 wt %, there may occur a loss of cohesion of PSA. A content in excess of 4.0 wt % may result in a loss of tack of PSA. Suitable alkoxy groups include methoxy, ethoxy, isopropoxy, and butoxy. When the alkoxy group is contained, methoxy is preferred.

Component (B) may be a mixture of two or more polyorganosiloxanes. Besides, $R^2{}_2SiO_{3/2}$ units and/or $R^2SiO_{2/2}$ units may be incorporated in component (B) insofar as they do not adversely impact the properties of the composition.

Component (B) may also be obtained from condensation reaction in the presence of a catalyst. This is the reaction of hydrolyzable groups available on the surface, from which effects such as improvement in bonding force are expectable. Reaction is performed in the presence of an alkaline catalyst at room temperature to reflux temperature and may be followed by neutralization if necessary.

Suitable alkaline catalysts include metal hydroxides such as lithium hydroxide, sodium hydroxide, potassium hydroxide, and calcium hydroxide; carbonates such as sodium carbonate and potassium carbonate; hydrogencarbonates such as sodium hydrogencarbonate and potassium hydrogencarbonate; metal alkoxides such as sodium methoxide and potassium butoxide; organometallic compounds such as butyl lithium; potassium silanolate; and nitrogen compounds such as ammonia gas, aqueous ammonia, methylamine, trimethylamine, and triethylamine. Inter alia, ammonia gas and aqueous ammonia are preferred. The temperature of condensation reaction may range from room temperature to the reflux temperature of an organic solvent. The reaction time may be 0.5 to 20 hours, preferably 1 to 16 hours, though not particularly limited. At the end of reaction, a neutralizing agent may be added for neutralizing the alkaline catalyst, if necessary. Suitable neutralizing agents include acidic gases such as hydrogen chloride and carbon dioxide, organic acids such as acetic acid, octylic acid, and citric acid, and mineral acids such as hydrochloric acid, sulfuric acid and phosphoric acid. Where ammonia gas, aqueous ammonia or low-boiling amine compound is used as the alkaline catalyst, an inert gas such as nitrogen may be bubbled to distill off the catalyst.

The amount of component (A) used is 100 to 40 parts by weight and the amount of component (B) is 60 to 0 part by weight, which means that component (B) may be omitted in some cases. The weight ratio of component (A) to component (B) is in the range of 100/0 to 40/60. In view of a bonding force on use in film or tape form, the weight ratio (A)/(B) is preferably 100/0 to 70/30, more preferably 100/0 to 80/20, and most preferably 100/0 to 90/10. If the proportion of (B) exceeds 60, adhesion may be adversely affected.

Component C

Component (C) is a polyorganohydrogensiloxane represented by the average compositional formula (2):

  (2)

wherein $R^3$ is each independently a substituted or unsubstituted $C_1$-$C_{10}$ monovalent hydrocarbon group, e and f are numbers in the range: e>0, f>0, and 0<e+f≤3, the polyorganohydrogensiloxane containing at least three Si—H groups per molecule.

In formula (2), $R^3$ which may be the same or different is a substituted or unsubstituted $C_1$-$C_{10}$ monovalent hydrocarbon group, examples of which include alkyl groups such as methyl, ethyl, propyl and butyl, cycloalkyl groups such as cyclohexyl, alkenyl groups such as vinyl, allyl, hexenyl and octenyl, and aryl groups such as phenyl. Also included are substituted forms of the foregoing groups in which some or all carbon-bonded hydrogen atoms are substituted by halogen atoms or other radicals, with suitable substituted groups including trifluoromethyl and 3,3,3-trifluoropropyl. Among others, saturated aliphatic groups and aromatic groups are preferable, with methyl and phenyl being most preferred. In average compositional formula (2), e and f are numbers in the range: e>0, f>0, and 0<e+f≤3.

Component (C) is exemplified by those of the general formula (8), but not limited thereto.

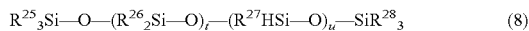
(8)

wherein $R^{25}$ and $R^{28}$ each are hydrogen or a $C_1$-$C_{10}$ monovalent hydrocarbon group, $R^{26}$ and $R^{27}$ each are a $C_1$-$C_{10}$ monovalent hydrocarbon group, t and u are numbers in the range: 0≤t≤100 and 3≤u≤80.

In formula (8), each of $R^{26}$ and $R^{27}$ is a $C_1$-$C_{10}$ monovalent hydrocarbon group, examples of which include alkyl groups such as methyl, ethyl, propyl and butyl, cycloalkyl groups such as cyclohexyl, alkenyl groups such as vinyl, allyl, hexenyl and octenyl, and aryl groups such as phenyl. Also included are substituted forms of the foregoing groups in which some or all carbon-bonded hydrogen atoms are substituted by halogen atoms or other radicals, with suitable substituted groups including trifluoromethyl and 3,3,3-trifluoropropyl. Preferably, $R^{26}$ and $R^{27}$ are saturated aliphatic groups or aromatic groups, with methyl and phenyl being most preferred. Each of $R^{25}$ and $R^{28}$ is hydrogen or a $C_1$-$C_{10}$ monovalent hydrocarbon group. Examples of the monovalent hydrocarbon group represented by $R^{25}$ and $R^{28}$ are the same as above. The subscripts t and u are numbers in the range: 0≤t≤100, preferably 0≤t≤80 or 0<t≤80, and 3≤u≤80, preferably 5≤u≤70.

In formula (8), t is an integer in the range: 0≤t≤100, preferably 0≤t≤80 or 0<t≤80, and u is an integer in the range: 3≤u≤80, preferably 4≤u≤70, more preferably 5≤u≤70.

Component (C) is generally prepared by ring-opening polymerization of a cyclic low-molecular-weight siloxane such as octamethylcyclotetrasiloxane and a Si—H containing siloxane such as tetramethylcyclotetrasiloxane in the presence of an acid catalyst. Since the polymerization product contains the reactant, cyclic low-molecular-weight siloxane, it is preferably purified by heating under reduced pressure while passing an inert gas into the product, for distilling off the cyclic siloxane.

Preferred examples of component (C) include those of the following structures, but are not limited thereto.

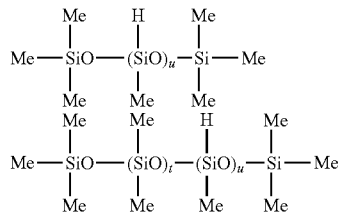

-continued

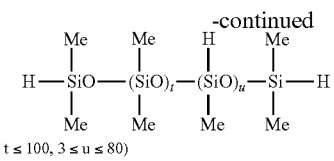
(0 ≤ t ≤ 100, 3 ≤ u ≤ 80)

Component (C) is used in an amount to provide 0.2 to 15 moles of Si—H groups per mole of alkenyl groups in components (A) and (B). The molar ratio of Si—H/alkenyl is preferably in the range of 0.5 to 10. If the SiH/alkenyl molar ratio is less than 0.2, crosslinking density may be too low to provide a cohesion and retaining force. If the SiH/alkenyl molar ratio exceeds 15, crosslinking density may be too high to attain appropriate bonding force (or adhesion strength) and tack.

Component D

Component (D) is a platinum group metal base catalyst for promoting hydrosilylation addition between alkenyl groups in components (A) and (B) and Si—H groups in component (C) for curing. Examples of the center metal of the catalyst include platinum, palladium, iridium, rhodium, osmium and ruthenium, with platinum being preferred. Suitable platinum catalysts include chloroplatinic acid, chloroplatinic acid in alcohols, reaction products of chloroplatinic acid with alcohols, reaction products of chloroplatinic acid with olefin compounds, and reaction products of chloroplatinic acid with vinyl-containing siloxanes.

Component (D) is used in an amount to give 1 to 500 ppm, preferably 2 to 450 ppm of metal based on the total weight of components (A) to (C). Less than 1 ppm of metal may result in slow reaction and undercure, failing to exert the desired effects of bonding and retaining forces. With more than 500 ppm of metal, the cured composition may become less flexible.

Component E

Component (E) is a compound containing at least one recurring unit having the formula (3) and at least one Si—H group per molecule, which is characteristic of the invention.

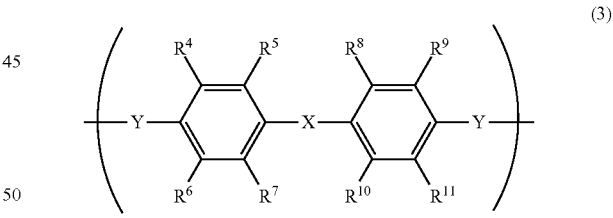
(3)

Herein $R^4$ to $R^{11}$ are each independently hydrogen, halogen, hydroxyl or a $C_1$-$C_6$ monovalent hydrocarbon group, X is selected from divalent organic groups having the formula (4):

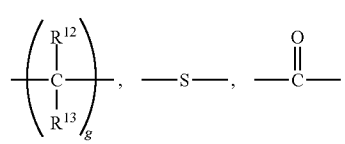
(4)

wherein $R^{12}$ and $R^{13}$ are each independently hydrogen, halogen, hydroxyl or a $C_1$-$C_6$ monovalent hydrocarbon group, and g is an integer of at least 1, and Y is each independently a $C_1$-$C_6$ divalent hydrocarbon group which may contain an ether moiety in its structure.

In formula (3), $R^4$ to $R^{11}$ are each independently hydrogen, halogen, hydroxyl or a $C_1$-$C_6$ monovalent hydrocarbon group. Suitable halogen atoms include fluorine, chlorine and bromine. Suitable $C_1$-$C_6$ monovalent hydrocarbon groups include methyl, ethyl, propyl, isopropyl and butyl. Inter alia, hydrogen and $C_1$-$C_6$ hydrocarbon groups are preferred, with hydrogen and methyl being most preferred.

X is a divalent organic group selected from formula (4). In formula (4), $R^{12}$ and $R^{13}$ are each independently hydrogen, halogen, hydroxyl or a $C_1$-$C_6$ monovalent hydrocarbon group. Suitable halogen atoms include fluorine, chlorine and bromine. Suitable $C_1$-$C_6$ monovalent hydrocarbon groups include methyl, ethyl, propyl, isopropyl and butyl. Inter alia, hydrogen and $C_1$-$C_6$ hydrocarbon groups are preferred, with hydrogen and methyl being most preferred. The subscript g is an integer of at least 1, preferably 1 to 8, and more preferably 1 to 5. If g exceeds 8, the content of alkyl in recurring units becomes high, which may adversely affect substrate adhesion.

Y is each independently a $C_1$-$C_6$ divalent hydrocarbon group which may contain an ether moiety in its structure. Examples of the $C_1$-$C_6$ divalent hydrocarbon group are given below.

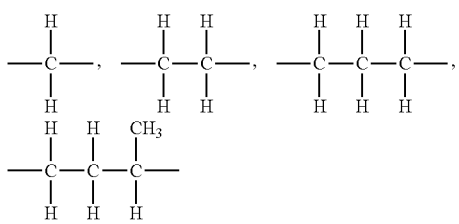

Examples of the hydrocarbon group containing an ether moiety in its structure are given below.

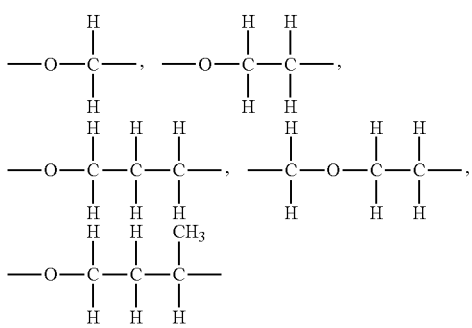

Examples of the structure of formula (3) are given below, but not limited thereto.

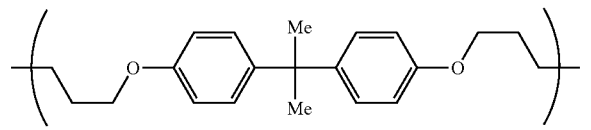

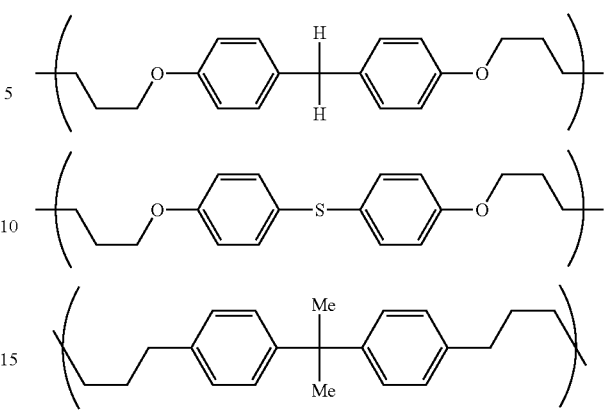

A group having a Si—H group corresponds to a compound having at least two Si—H groups per molecule, represented by the average compositional formula (9) to be described later, from which at least one hydrogen atom is eliminated, with the proviso that at least one Si—H group is kept. Component (E) may have such a Si—H containing group at the molecular end. Examples of the compound represented by formula (9) are shown below.

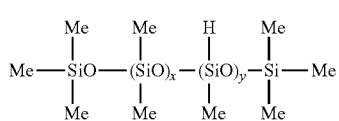

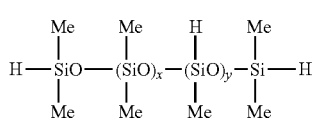

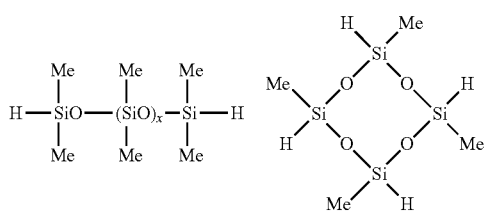

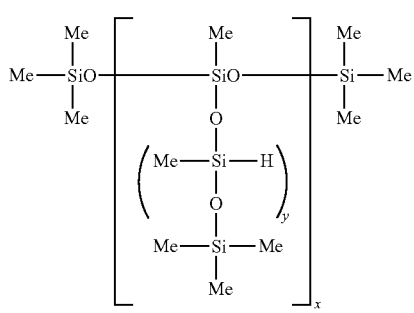

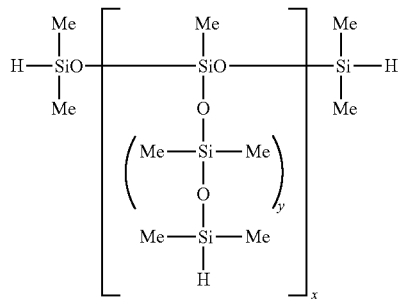
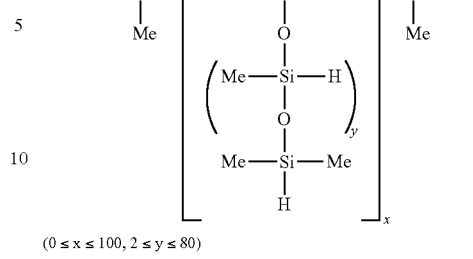
$(0 \leq x \leq 100, 2 \leq y \leq 80)$
Examples of component (E) are shown below, but not limited thereto. Herein z1 and z2 each are a number of 0 to 10, preferably 0 to 4.
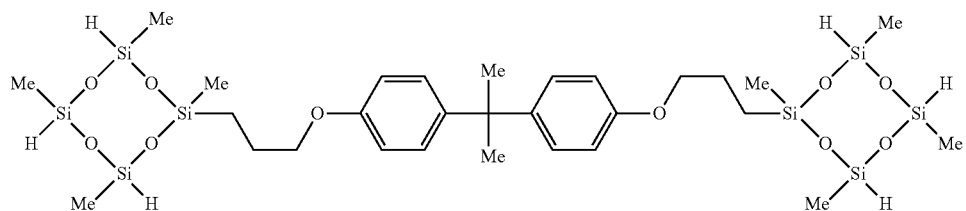
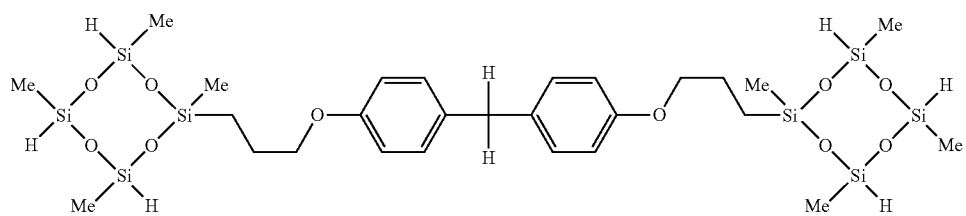
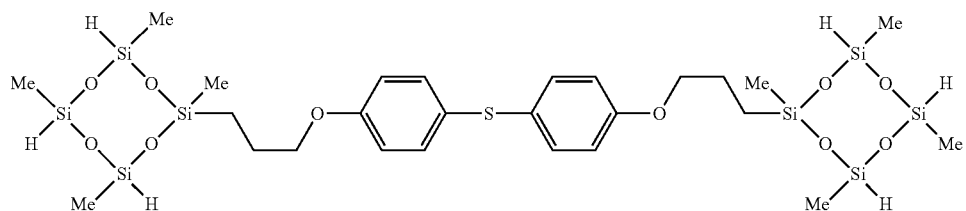
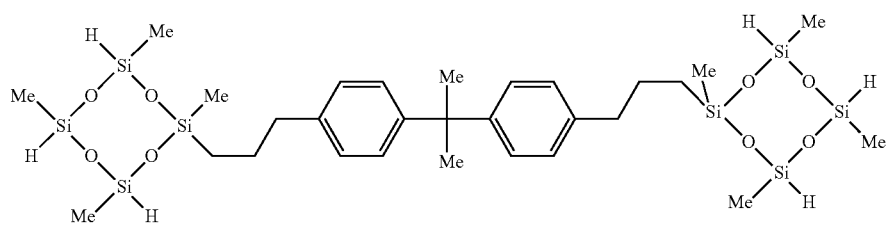

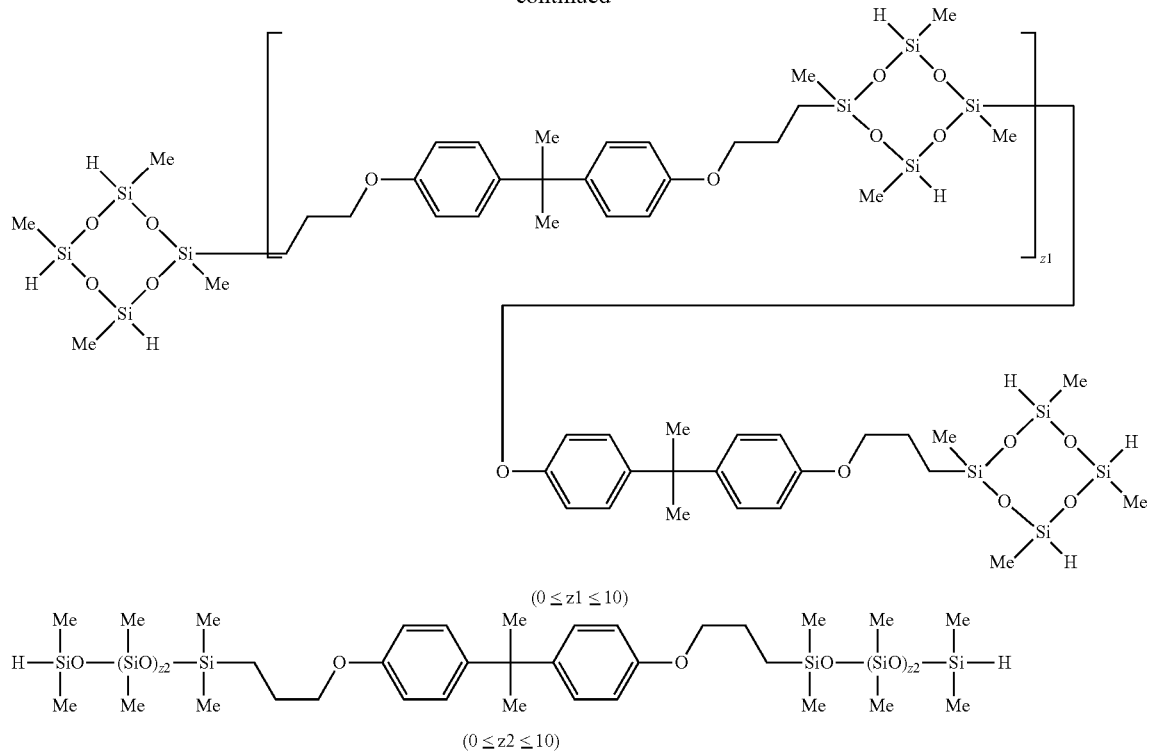

(0 ≤ z1 ≤ 10)

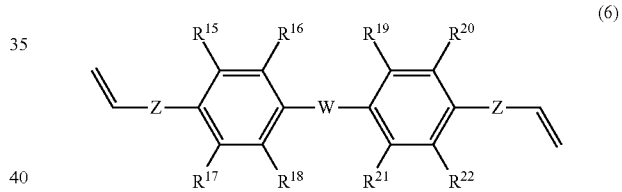

(0 ≤ z2 ≤ 10)

Component (E) is a substrate adhesion promoter for curable silicone composition, that is, a component for improving the adhesion of silicone resin to substrate. It is presumed that adhesion improvement is achieved as follows. The segment of formula (3) included in component (E) is effective for substrate adhesion, and in particular, aromatic rings function well. In the case of a plastic substrate, since aromatic rings are contained in the plastic as well, interaction occurs between π electrons in these aromatic rings to exert a stacking effect to improve adhesion. Further since a segment having a Si—H group is adjacent to the aromatic ring segment, a bond is formed between the Si—H group and a functional group on the substrate surface, which also contributes to adhesion improvement.

Component (E) is used in an amount of 0.01 to 10 parts by weight relative to the total weight of components (A) to (C). The amount of component (E) is preferably 0.05 to 5 parts, more preferably 0.1 to 3 parts, and even more preferably 0.1 to 1 part by weight. Less than 0.01 pbw of component (E) is ineffective for adhesion improvement. If the amount of component (E) exceeds 10 pbw, which indicates excessive Si—H groups in the silicone PSA composition, then transfer of PSA to the adherend may occur.

Component (E) may be obtained, for example, from hydrosilylation addition of (E1) an organic compound having the formula (6) and (E2) a compound having at least two Si—H groups per molecule in the presence of a catalyst.

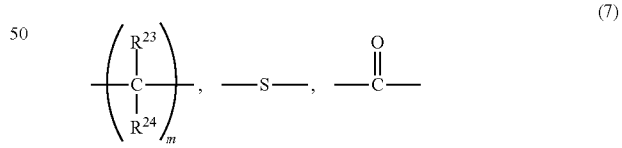

Herein $R^{15}$ to $R^{22}$ are each independently hydrogen, halogen, hydroxyl or a $C_1$-$C_6$ monovalent hydrocarbon group, W is a divalent organic group selected from the formula (7), and Z is each independently a $C_1$-$C_6$ hydrocarbon group which may contain an ether moiety in its structure.

$$\left(\begin{array}{c}R^{23}\\|\\-C-\\|\\R^{24}\end{array}\right)_m, \quad -S-, \quad -\overset{O}{\underset{\|}{C}}- \tag{7}$$

Herein $R^{23}$ and $R^{24}$ are each independently hydrogen, halogen, hydroxyl or a $C_1$-$C_6$ monovalent hydrocarbon group, and m is an integer of at least 1.

In formula (6), $R^{15}$ to $R^{22}$ are each independently hydrogen, halogen, hydroxyl or a $C_1$-$C_6$ monovalent hydrocarbon group. Suitable halogen atoms include fluorine, chlorine and bromine. Suitable $C_1$-$C_6$ monovalent hydrocarbon groups include methyl, ethyl, propyl, isopropyl and butyl. Inter alia, hydrogen and $C_1$-$C_6$ hydrocarbon groups are preferred, with hydrogen and methyl being most preferred.

W is a divalent organic group selected from the formula (7). $R^{23}$ and $R^{24}$ are each independently hydrogen, halogen, hydroxyl or a $C_1$-$C_6$ monovalent hydrocarbon group. Suitable halogen atoms include fluorine, chlorine and bromine. Suitable $C_1$-$C_6$ monovalent hydrocarbon groups include methyl, ethyl, propyl, isopropyl and butyl. Inter alia, hydrogen and $C_1$-$C_6$ hydrocarbon groups are preferred, with hydrogen and methyl being most preferred. The subscript m is an integer of at least 1, preferably 1 to 8, and more preferably 1 to 5. If m is greater than 8, the content of alkyl groups in the recurring units becomes higher, which may adversely affect substrate adhesion.

Z is each independently a $C_1$-$C_6$ divalent hydrocarbon group which may contain an ether moiety in its structure. Examples of the $C_1$-$C_6$ divalent hydrocarbon group are given below.

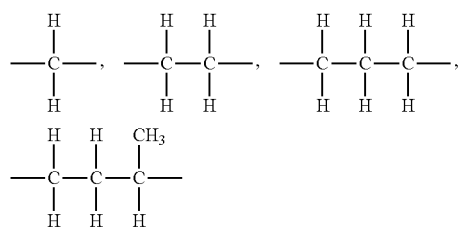

Examples of the hydrocarbon group containing an ether moiety in its structure are given below.

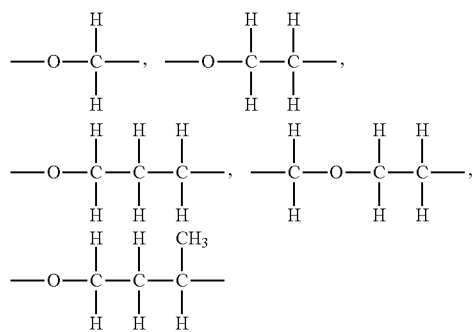

Examples of the structure of component (E1) are given below, but not limited thereto.

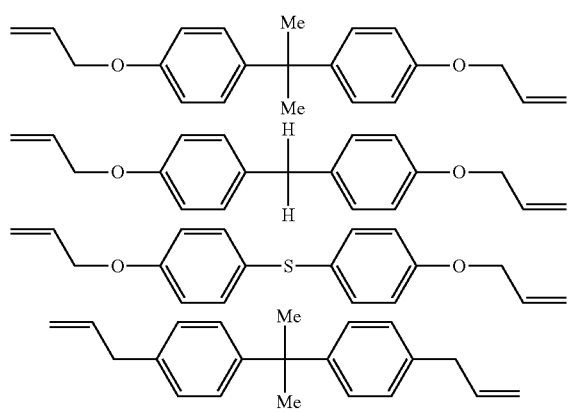

Component (E2) is a compound having at least two Si—H groups per molecule, represented by the average compositional formula (9):

$$R^{29}{}_v H_w SiO_{(4-v-w)/2} \quad (9)$$

wherein $R^{29}$ is independently a substituted or unsubstituted, $C_1$-$C_{10}$ monovalent hydrocarbon group, v and w are numbers in the range: v>0, w>0, and 0<v+w≤3.

In formula (9), $R^{29}$ is a $C_1$-$C_{10}$ monovalent hydrocarbon group. Suitable monovalent hydrocarbon groups include alkyl groups such as methyl, ethyl, propyl and butyl, cycloalkyl groups such as cyclohexyl, alkenyl groups such as vinyl, allyl, hexenyl and octenyl, and aryl groups such as phenyl. Also included are substituted forms of the foregoing groups in which some or all carbon-bonded hydrogen atoms are substituted by halogen atoms or other radicals, with suitable substituted groups including trifluoromethyl and 3,3,3-trifluoropropyl. Among others, saturated aliphatic groups and aromatic groups are preferable, with methyl and phenyl being most preferred.

Examples of the structure of component (E2) are given below, but not limited thereto.

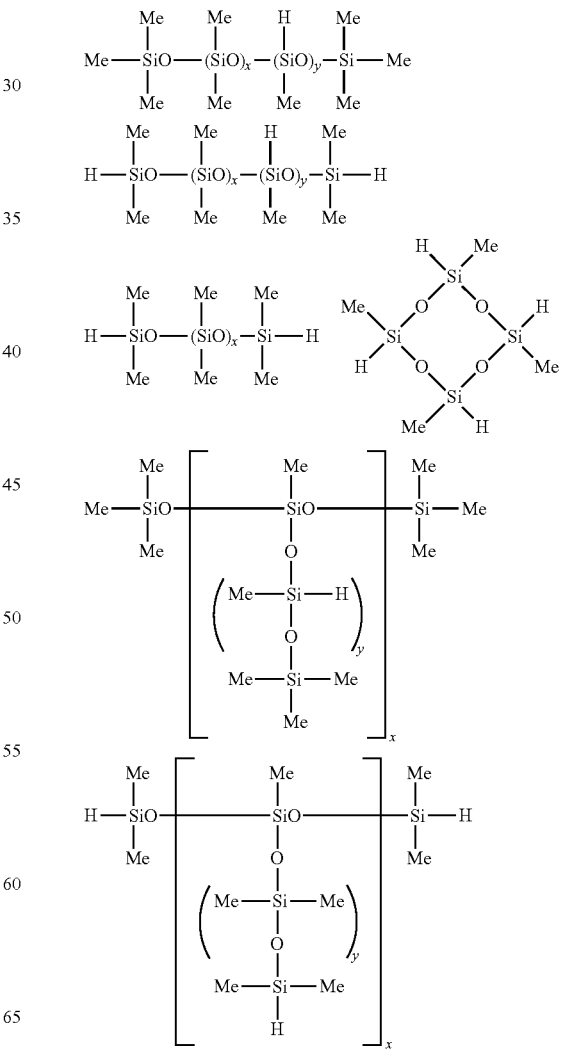

-continued

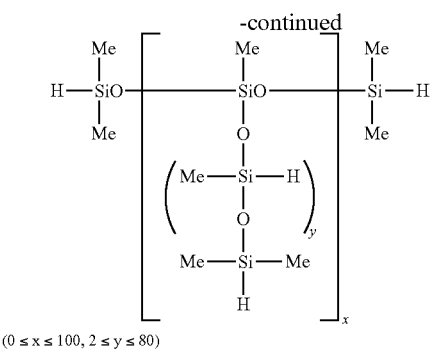

$(0 \leq x \leq 100, 2 \leq y \leq 80)$

Component (E) is a compound obtained from hydrosilylation addition of compounds (E1) and (E2), specifically, addition reaction between alkenyl groups in compound (E1) and Si—H groups in compound (E2). In the reaction, not all Si—H groups in compound (E2) are reacted, and at least one Si—H group must be left behind. This ensures that on use of the curable silicone composition to which compound (E) is added, a functional group for addition is available in the relevant composition. Through the addition, the composition is endowed with the function of compound (E).

On reaction, compounds (E1) and (E2) are used in such amounts that provided that me1 is the moles of alkenyl groups in compound (E1) and me2 is the moles of Si—H groups in compound (E2), the molar ratio me2/me1 is $1<me2/me1<14$, preferably $1<me2/me1<10$, and more preferably $1<me2/me1<8$. If $me2/me1<1$, Si—H groups necessary for addition are not left. If $me2/me1>14$, which indicates that the proportion of recurring units derived from (E1) in (E) is reduced, the component (E) may fail to exert the full function.

A platinum group metal base catalyst is necessary in order to promote hydrosilylation addition reaction between alkenyl groups in compound (E1) and Si—H groups in compound (E2). Examples of the center metal of the catalyst include platinum, palladium, iridium, rhodium, osmium and ruthenium, with platinum being preferred. Suitable platinum catalysts include chloroplatinic acid, chloroplatinic acid in alcohols, reaction products of chloroplatinic acid with alcohols, reaction products of chloroplatinic acid with olefin compounds, and reaction products of chloroplatinic acid with vinyl-containing siloxanes.

The catalyst is preferably used in an amount to give 0.1 to 200 ppm, more preferably 0.3 to 180 ppm of metal based on the total weight of compounds (E1) and (E2). With less than 0.1 ppm of metal, reaction may take place slowly and to a short extent. With more than 200 ppm of metal, the catalyst removal after the completion of reaction may become insufficient and the residual catalyst may adversely affect shelf stability.

The hydrosilylation addition reaction between alkenyl groups in compound (E1) and Si—H groups in compound (E2) to produce compound (E) may be performed in a standard way. Specifically, the reactor is charged with alkenyl-containing compound (E1) and the catalyst, Si—H group-containing compound (E2) is added thereto, and the contents are heated and mixed. At the end of reaction, the product is purified by vacuum distillation to remove impurities. Optionally a solvent may be used in the reaction. Suitable solvents include aromatic hydrocarbon solvents such as toluene and xylene, aliphatic hydrocarbon solvents such as hexane, heptane, octane, isooctane, decane, cyclohexane, methylcyclohexane and isoparaffin, other hydrocarbon solvents such as industrial gasoline, petroleum benzine, and solvent naphtha, and ketone solvents such as acetone, methyl ethyl ketone, 2-pentanone, 3-pentanone, 2-hexanone, 2-heptanone, 4-heptanone, methyl isobutyl ketone, diisobutyl ketone, acetonylacetone, and cyclohexanone.

Component F

Component (F), when added to a silicone PSA composition, is to introduce a siloxane pendant to the crosslinked network of the composition. The siloxane pendant thus introduced plays the role of preventing the bonding force to the adherend from increasing with the lapse of time. When the curable silicone composition is used as the adhesive for PSA articles, there is a tendency that the bonding force to the adherend increases with the lapse of time. Component (F), when used, is effective for improving substrate adhesion and preventing the bonding force to the adherend from increasing.

Specifically component (F) is an organohydrogenpolysiloxane represented by the average compositional formula (5), exclusive of component (C).

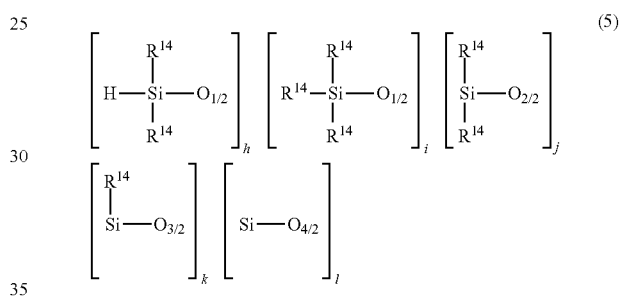

Herein $R^{14}$ is each independently a $C_1$-$C_{10}$ monovalent hydrocarbon group, h is an integer of at least 1, i is an integer of at least 1, j is an integer of at least 1, k and l each are an integer of at least 0, and $5 \leq h+i+j+k+l \leq 500$.

In formula (5), $R^{14}$ which may be the same or different is a $C_1$-$C_{10}$ monovalent hydrocarbon group. Suitable monovalent hydrocarbon groups include alkyl groups such as methyl, ethyl, propyl and butyl, cycloalkyl groups such as cyclohexyl, alkenyl groups such as vinyl, allyl, hexenyl and octenyl, and aryl groups such as phenyl. Also included are substituted forms of the foregoing groups in which some or all carbon-bonded hydrogen atoms are substituted by halogen atoms or other radicals, with suitable substituted groups including trifluoromethyl and 3,3,3-trifluoropropyl. Among others, saturated aliphatic groups and aromatic groups are preferable, with methyl and phenyl being most preferred.

The subscript h is an integer of at least 1, preferably 1 to 3, and most preferably h=1. That is, a polyorganohydrogensiloxane having a Si—H group only at a molecular end is preferred, and a polyorganohydrogensiloxane having one Si—H group at a molecular end is more preferred. From the above-discussed standpoint, a polysiloxane of structure having a Si—H group capable of crosslinking to the end of polysiloxane is preferred as component (F), with a polysiloxane having one Si—H group per molecule being more preferred. The subscript i is an integer of at least 1, j is an integer of at least 1, k and l each are an integer of at least 0, and $5 \leq h+i+j+k+l \leq 500$, preferably $7 \leq h+i+j+k+l \leq 300$, and more preferably $8 \leq h+i+j+k+l \leq 200$. If $h+i+j+k+l<5$, the above-mentioned pendant effect is not fully exerted. If $h+i+j+k+l>500$, the pendant is so long that molecular entanglement may occur between pendants, sometimes failing to prevent the bonding force from increasing.

Examples of the structure of component (F) are given below, but not limited thereto. In the following formulae, i-Pr stands for isopropyl, and n-Bu for normal butyl; A is a number of 4 to 300, preferably 4 to 100, and B is a number of 1 to 10.

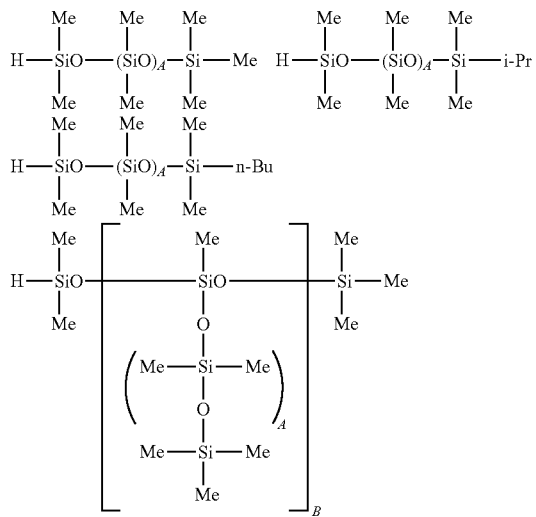

If used, component (F) is added in an amount of 0.01 to 100 parts by weight relative to the total weight of components (A) to (C). The amount of component (F) added is preferably 0.05 to 50 parts, more preferably 0.1 to 20 parts, and even more preferably 0.5 to 10 parts by weight. If the amount of component (F) added is less than 0.01 pbw, the effect of suppressing bonding force increase becomes weak. If the amount of component (F) exceeds 100 pbw, which indicates excessive Si—H groups in the silicone PSA composition, then transfer of PSA to the adherend may occur.

Component G

Component (G) is a regulator. When the silicone PSA composition is prepared or applied to the substrate, the regulator serves to prevent addition reaction from starting prior to heat curing and to prevent the treatment solution from thickening or gelling. The reaction regulator coordinates with the platinum group metal as the addition catalyst to control addition reaction, but when heated for curing, releases the coordination, allowing the catalytic activity to develop. Suitable regulators include 3-methyl-1-butyn-3-ol, 3-methyl-1-pentyn-3-ol, 3,5-dimethyl-1-hexyn-3-ol, ethynylcyclohexanol (or 1-ethynyl-1-cyclohexanol), 3-methyl-3-trimethylsiloxy-1-butyne, 3-methyl-3-trimethylsiloxy-1-pentyne, 3,5-dimethyl-3-trimethylsiloxy-1-hexyne, 1-ethynyl-1-trimethylsiloxycyclohexane, bis(2,2-dimethyl-3-butynoxy)dimethylsilane, 1,3,5,7-tetramethyl-1,3,5,7-tetravinylcyclotetrasiloxane, 1,1,3,3-tetramethyl-1,3-divinyldisiloxane, maleic acid esters, and adipic acid esters.

Component (G) is used in an amount of 0.01 to 5 parts, preferably 0.05 to 2 parts by weight relative to the total weight of components (A) to (C).

Miscellaneous

When all the aforementioned components are mixed together, sometimes the mixture may become highly viscous and difficult to handle. In such a case, a solvent may optionally be added for dilution. Suitable solvents include aromatic hydrocarbon solvents such as toluene and xylene; aliphatic hydrocarbon solvents such as hexane, heptane, octane, isooctane, decane, cyclohexane, methylcyclohexane and isoparaffin; other hydrocarbon solvents such as industrial gasoline, petroleum benzine, and solvent naphtha; ketone solvents such as acetone, methyl ethyl ketone, 2-pentanone, 3-pentanone, 2-hexanone, 2-heptanone, 4-heptanone, methyl isobutyl ketone, diisobutyl ketone, acetonylacetone, and cyclohexanone; ester solvents such as ethyl acetate, propyl acetate, isopropyl acetate, butyl acetate, and isobutyl acetate; ether solvents such as diethyl ether, dipropyl ether, diisopropyl ether, dibutyl ether, 1,2-dimethoxyethane, and 1,4-dioxane; solvents having ester and ether moieties such as 2-methoxyethyl acetate, 2-ethoxyethyl acetate, propylene glycol monomethyl ether acetate, and 2-butoxyethyl acetate; and siloxane solvents such as hexamethyldisiloxane, octamethyltrisiloxane, octamethylcyclotetrasiloxane, decamethylcyclopentasiloxane, tris(trimethylsiloxy)methylsilane, and tetrakis(trimethylsiloxy)silane, which may be used alone or in admixture of two or more.

PSA Articles

The silicone PSA composition defined above is applied to at least one surface of a substrate and cured thereto. In this way, a PSA article having a PSA layer formed on at least one surface of a substrate is obtained.

The substrate to which the silicone PSA composition is applied may be selected from paper, plastic film, glass and metals. Examples of paper include wood-free paper, coated paper, art paper, glassine paper, polyethylene-laminated paper, and kraft paper. Suitable plastic films include polyethylene film, polypropylene film, polyester film, polyimide film, polyvinyl chloride film, polyvinylidene chloride film, polyvinyl alcohol film, polycarbonate film, polytetrafluoroethylene film, polystyrene film, ethylene-vinyl acetate copolymer film, ethylene-vinyl alcohol copolymer film, triacetylcellulose film, polyether ether ketone film, and polyphenylene sulfide film. The glass used herein is not particularly limited with respect to the thickness and type, and chemically strengthened glass is acceptable. Also useful are glass fibers which may be used alone or as composites with resins. Suitable metals include aluminum foil, copper foil, gold foil, silver foil, and nickel foil.

Among the foregoing substrate examples, the silicone PSA composition is most advantageous when plastic films are used as the substrate. When the silicone PSA composition is coated to plastic films as the substrate, there are manufactured PSA tapes and sheets which find a wide variety of applications. The adherend to which the PSA tape is applied includes those of glass, metals and plastics. The PSA articles are used as protective film on various displays, electric insulating tape, masking tape, splicing tape, and skin plaster. Suitable displays include those for displaying letters, symbols and images, such as TV monitors, computer monitors, personal digital assistant (PDA) monitors, surveillance monitors, video cameras, digital cameras, mobile phones, instrumental panel displays of automobiles, instrumental board displays in various facilities, appliances and tools, liquid crystal displays, organic EL displays, touch-panels in automatic ticket vending machines and automated teller machines, and flat panel displays (FPD).

Although the thickness of the substrate, especially film substrate is not particularly limited, a thickness of 1 to 200 μm is preferred, and a thickness of 5 to 150 μm is more preferred. When the substrate is a film, there is obtained a PSA film comprising a substrate film and a PSA layer formed by coating the silicone composition onto at least one surface of the film and curing the coating.

For improving the adhesion between the substrate and the PSA layer, the substrate may be pretreated such as by primer treatment, corona treatment, etching treatment, plasma treatment, or sand blasting. Corona treatment is preferred. Primer treatment may be omitted, that is, a primer layer-free structure is acceptable.

A surface of the substrate opposite to the PSA layer-bearing surface may be treated so as to be damage-proof, stain-proof, fingerprint-proof, antiglare, antireflective or antistatic. This surface treatment may be performed before or after the PSA layer is formed. Exemplary damage-proof treatments or hardcoat treatments include coating of hardcoat agents based on acrylate, silicone, oxetane, inorganic materials, and organic/inorganic hybrid materials. Exemplary stain-proof treatments include fluorinated, silicone, ceramic, and photocatalyst stain-proof treatment agents. Exemplary antireflection treatments include wet treatment by coating and dry treatment by vapor deposition or sputtering, both of a fluorinated or silicone antireflection agent. Exemplary antistatic treatments include surfactants, silicone, organoboron, electroconductive polymer, and metal oxide antistatic agents, and metallizing.

Any known means or method for application may be used in coating the substrate with the PSA composition. For example, a comma coater, lip coater, roll coater, die coater, knife coater, blade coater, rod coater, kiss-roll coater, and gravure coater may be used. Screen printing, dipping, casting and spraying methods are also acceptable.

Although the coating weight is not particularly limited, the PSA layer as cured preferably has a thickness of 0.1 to 300 μm, more preferably 0.5 to 200 μm.

In general, the catalyst is not premixed in the silicone PSA composition. The catalyst is added and uniformly mixed immediately before the PSA composition is used in practice. The composition may be cured at a temperature of 80 to 150° C. for 20 seconds to 10 minutes although the curing conditions are not limited thereto.

After curing, the silicone PSA composition preferably has a bonding force of 0.01 to 12.0 N/25 mm, more preferably 0.01 to 10.0 N/25 mm, and even more preferably 0.01 to 8.0 N/25 mm. A bonding force of at least 0.01 N/25 mm ensures sticking to the adherend whereas a bonding force of up to 12.0 N/25 mm ensures ease of reworking.

EXAMPLE

Preparation Examples, Examples and Comparative Examples are given below for further illustrating the invention although the invention is not limited thereto. All parts and % are by weight. The term "Me" stands for methyl, "Vi" for vinyl, and "n-Bu" for normal butyl.

Preparation of Component (E)

Preparation Example 1

A 500-ml separable flask equipped with a stirrer, thermometer, dropping funnel and reflux condenser was charged with 144.3 g (0.6 mol) of 1,3,5,7-tetramethylcyclotetrasiloxane, 144.3 g of toluene, and 0.03 g of a toluene solution of 1,3-divinyl-1,1,3,3-tetramethyldisiloxane platinum(0) complex having a platinum content of 0.5 wt %. The contents were mixed by stirring and heated at about 60-65° C. From the dropping funnel, 61.7 g (0.2 mol) of 2,2-bis(4-allyloxyphenyl)propane was added dropwise to the flask. After the completion of dropwise addition, the contents were heated at about 80-85° C. and held at the temperature for 1 hour for reaction to run. At the end of reaction, 0.3 g of activated carbon was added to the reaction solution, which was stirred for 2 hours. The activated carbon was removed by filtration for thereby removing the catalyst, platinum. The filtrate was concentrated in vacuum at 90° C. for 8 hours, yielding a colorless transparent liquid. On analysis, it was identified to be a mixture of the following compounds wherein $z1=0$ to 4, mainly compound wherein $z1=2$.

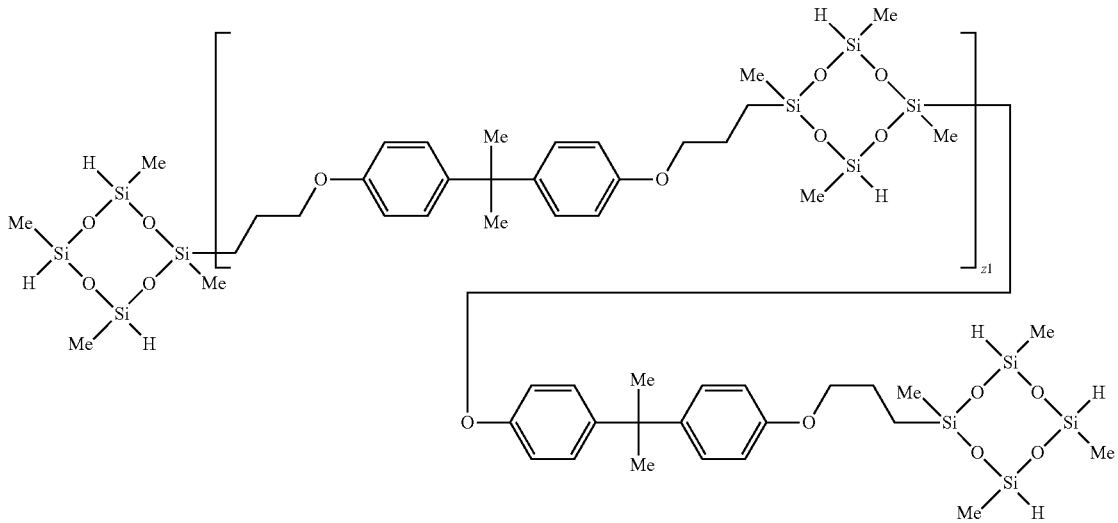

Preparation Example 2

A 500-ml separable flask equipped with a stirrer, thermometer, dropping funnel and reflux condenser was charged with 96.2 g (0.4 mol) of 1,3,5,7-tetramethylcyclotetrasiloxane, 96.2 g of toluene, and 0.03 g of a toluene solution of 1,3-divinyl-1,1,3,3-tetramethyldisiloxane platinum(0) complex having a platinum content of 0.5 wt %. The contents were mixed by stirring and heated at about 60-65° C. From the dropping funnel, 61.7 g (0.2 mol) of 2,2-bis(4-allyloxyphenyl)propane was added dropwise to the flask. After the completion of dropwise addition, the contents were heated at about 80-85° C. and held at the temperature for 2 hours for reaction to run. At the end of reaction, 0.3 g of activated carbon was added to the reaction solution, which was stirred for 2 hours. The activated carbon was removed by filtration for thereby removing the catalyst, platinum. The filtrate was concentrated in vacuum at 90° C. for 8 hours, yielding a colorless transparent liquid. On analysis, it was identified to be a mixture of the compounds of the same formula as in Preparation Example 1 wherein z1=0 to 4, mainly compound wherein z1=3.

Preparation Example 3

A 500-ml separable flask equipped with a stirrer, thermometer, dropping funnel and reflux condenser was charged with 192.4 g (0.8 mol) of 1,3,5,7-tetramethylcyclotetrasiloxane, 72.2 g of toluene, and 0.03 g of a toluene solution of 1,3-divinyl-1,1,3,3-tetramethyldisiloxane platinum(0) complex having a platinum content of 0.5 wt %. The contents were mixed by stirring and heated at about 60-65° C. From the dropping funnel, 61.7 g (0.2 mol) of 2,2-bis(4-allyl ether phenyl)propane was added dropwise to the flask. After the completion of dropwise addition, the contents were heated at about 80-85° C. and held at the temperature for 1 hour for reaction to run. At the end of reaction, 0.3 g of activated carbon was added to the reaction solution, which was stirred for 2 hours. The activated carbon was removed by filtration for thereby removing the catalyst, platinum. The filtrate was concentrated in vacuum at 90° C. for 8 hours, yielding a colorless transparent liquid. On analysis, it was identified to be a mixture of the compounds of the same formula as in Preparation Example 1 wherein z1=0 to 3, mainly compound wherein z1=0.

Comparative Preparation Example 1

A 500-ml separable flask equipped with a stirrer, thermometer, dropping funnel and reflux condenser was charged with 86.54 g (0.7 mol) of dimethyldimethoxysilane, 52.89 g (0.4 mol) of methylvinyldimethoxysilane, and 8.00 g of methanol. From the dropping funnel, an amount of KOH (corresponding to 50 ppm based on the total weight of two silanes) and 100 g of distilled water were added dropwise. Reaction was run for 2 hours under methanol reflux, after which the liquid was concentrated in vacuum at 60° C. for 4 hours, yielding a vinyl-containing siloxane end-capped with a silanol or methoxy group in oil form. The oil was combined with 3-glycidoxypropyltrimethoxysilane in a weight ratio of 50/50, which were mixed by stirring at room temperature for 1 hour, obtaining the end compound.

Silicone PSA Composition

Example 1

A mixture was prepared by mixing the following components (A), (B), (C), and (G). Component (A) was 90 parts of a vinyl-containing polydimethylsiloxane of the average compositional formula (a).

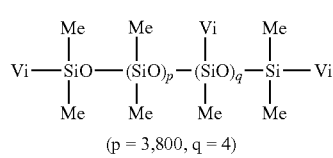

(p = 3,800, q = 4)

Component (B) was 10 parts as nonvolatile of a 60 wt % toluene solution of polyorganosiloxane consisting of $Me_3SiO_{1/2}$ units and $SiO_2$ units in a molar ratio ($Me_3SiO_{1/2}/SiO_2$) of 0.85. Component (C) was a mixture of 0.29 part of a polyorganohydrogensiloxane of the average compositional formula (c-1) and 0.41 part of a polyorganohydrogensiloxane of the average compositional formula (c-2).

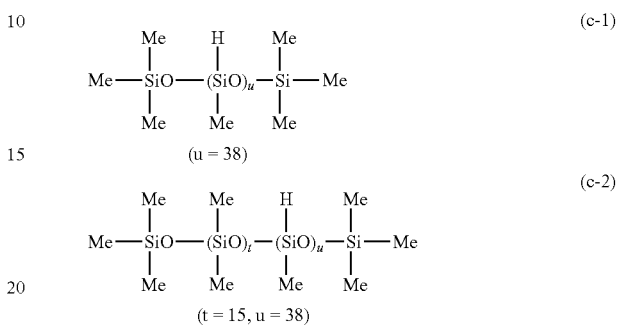

Component (G) was 0.16 part of ethynylcyclohexanol. The mixture was diluted with toluene into a mixture having an active ingredient content of 60 wt %.

To 100 parts of the mixture was added 50 parts of toluene. Further components (D) and (E) were added. Component (D) was 0.5 part of a toluene solution of 1,3-divinyl-1,1,3,3-tetramethyldisiloxane platinum(0) complex having a platinum content of 0.5 wt %. Component (E) was 2 parts of the compound of Preparation Example 1. In this way, a silicone PSA composition was prepared.

Example 2

A silicone PSA composition was prepared as in Example 1 aside from using 0.5 part of the compound of Preparation Example 1.

Example 3

A silicone PSA composition was prepared as in Example 1 aside from using 0.4 part of the compound of Preparation Example 1.

Example 4

A silicone PSA composition was prepared as in Example 1 aside from using 0.3 part of the compound of Preparation Example 1.

Example 5

A silicone PSA composition was prepared as in Example 1 aside from using 0.2 part of the compound of Preparation Example 1.

Example 6

A silicone PSA composition was prepared as in Example 2 aside from using 0.06 part of polyorganohydrogensiloxane of formula (c-1) and 0.08 part of polyorganohydrogensiloxane of formula (c-2).

Example 7

A silicone PSA composition was prepared as in Example 2 aside from using 0.46 part of polyorganohydrogensiloxane of formula (c-1) and 0.66 part of polyorganohydrogensiloxane of formula (c-2).

Example 8

A silicone PSA composition was prepared as in Example 2 aside from using 0.5 part of the compound of Preparation Example 2 instead of the compound of Preparation Example 1.

Example 9

A silicone PSA composition was prepared as in Example 2 aside from using 0.5 part of the compound of Preparation Example 3 instead of the compound of Preparation Example 1.

Example 10

A silicone PSA composition was prepared by adding 2.0 parts of a polyorganohydrogensiloxane of the average compositional formula (f-1) as component (F) to the liquid composition of Example 2.

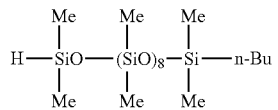

(f-1)

Example 11

A silicone PSA composition was prepared by further adding 2.0 parts of a polyorganohydrogensiloxane of the average compositional formula (f-2) as component (F) to the liquid composition of Example 2.

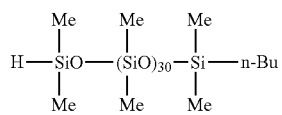

(f-2)

Example 12

A silicone PSA composition was prepared by adding 2.0 parts of a polyorganohydrogensiloxane of the average compositional formula (f-3) as component (F) to the liquid composition of Example 2.

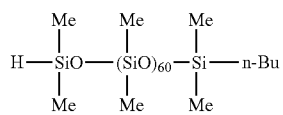

(f-3)

Example 13

A silicone PSA composition was prepared by adding 2.0 parts of a polyorganohydrogensiloxane of the average compositional formula (f-4) as component (F) to the liquid composition of Example 2.

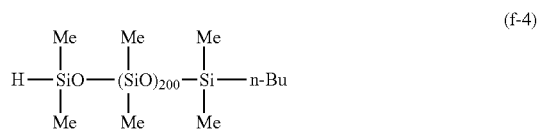

(f-4)

Example 14

A silicone PSA composition was prepared as in Example 11 aside from adding 1.0 part of polyorganohydrogensiloxane of formula (f-2).

Example 15

A silicone PSA composition was prepared as in Example 11 aside from adding 4.5 parts of polyorganohydrogensiloxane of formula (f-2).

Example 16

A mixture was prepared by mixing the following components (A), (C), and (G). Component (A) was 100 parts of a vinyl-containing polydimethylsiloxane of the average compositional formula (a).

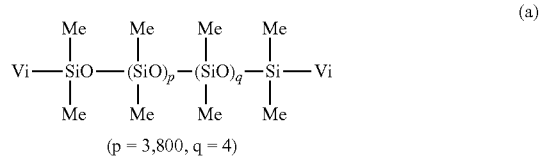

(a)

Component (C) was a mixture of 0.32 part of a polyorganohydrogensiloxane of the average compositional formula (c-1) and 0.46 part of a polyorganohydrogensiloxane of the average compositional formula (c-2).

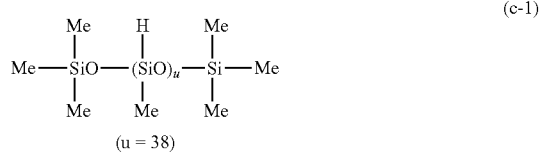

(c-1)

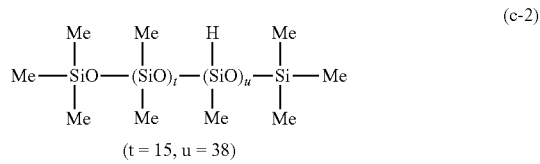

(c-2)

Component (G) was 0.18 part of ethynylcyclohexanol. The mixture was diluted with toluene into a mixture having an active ingredient content of 60 wt %.

To 100 parts of the mixture was added 50 parts of toluene. Further components (D) and (E) were added. Component (D) was 0.5 part of a toluene solution of 1,3-divinyl-1,1,3,3-tetramethyldisiloxane platinum(0) complex having a platinum content of 0.5 wt %. Component (E) was 0.5 part of the adhesion promoter of Preparation Example 1. In this way, a silicone PSA composition was prepared.

Example 17

A silicone PSA composition was prepared by further adding 2.0 parts of a polyorganohydrogensiloxane of the average compositional formula (f-2) as component (F) to the liquid composition of Example 16.

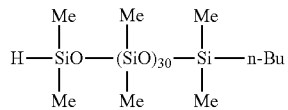

Example 18

A mixture was prepared by mixing the following components (A), (B), (C), and (G). Component (A) was 80 parts of a vinyl-containing polydimethylsiloxane of the average compositional formula (a).

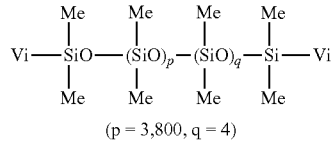

Component (B) was 20 parts as nonvolatile of a 60 wt % toluene solution of polyorganosiloxane consisting of $Me_3SiO_{1/2}$ units and $SiO_2$ units in a molar ratio ($Me_3SiO_{1/2}/SiO_2$) of 0.85. Component (C) was a mixture of 0.26 part of a polyorganohydrogensiloxane of the average compositional formula (c-1) and 0.36 part of a polyorganohydrogensiloxane of the average compositional formula (c-2).

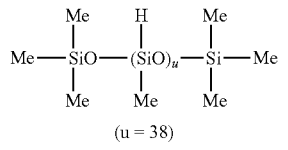

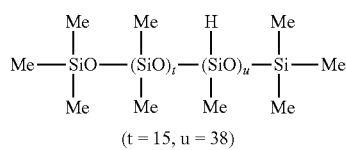

Component (G) was 0.18 part of ethynylcyclohexanol. The mixture was diluted with toluene into a mixture having an active ingredient content of 60 wt %.

To 100 parts of the mixture was added 50 parts of toluene. Further components (D) and (E) were added. Component (D) was 0.5 part of a toluene solution of 1,3-divinyl-1,1,3,3-tetramethyldisiloxane platinum(0) complex having a platinum content of 0.5 wt %. Component (E) was 0.5 part of the adhesion promoter of Preparation Example 1. In this way, a silicone PSA composition was prepared.

Example 19

A silicone PSA composition was prepared by further adding 2.0 parts of a polyorganohydrogensiloxane of the average compositional formula (f-2) as component (F) to the liquid composition of Example 18.

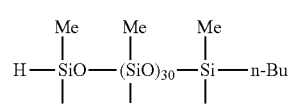

Example 20

A mixture was prepared by mixing the following components (A), (B), (C), and (G). Component (A) was 60 parts of a vinyl-containing polydimethylsiloxane of the average compositional formula (a).

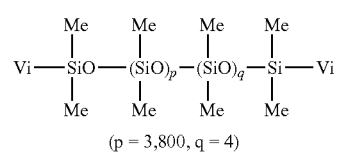

Component (B) was 40 parts as nonvolatile of a 60 wt % toluene solution of polyorganosiloxane consisting of $Me_3SiO_{1/2}$ units and $SiO_2$ units in a molar ratio ($Me_3SiO_{1/2}/SiO_2$) of 0.85. Component (C) was a mixture of 0.19 part of a polyorganohydrogensiloxane of the average compositional formula (c-1) and 0.27 part of a polyorganohydrogensiloxane of the average compositional formula (c-2).

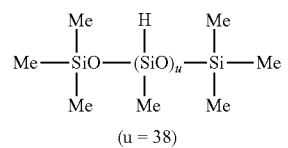

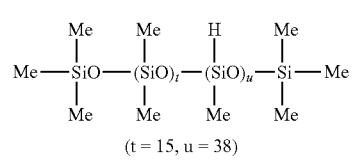

Component (G) was 0.18 part of ethynylcyclohexanol. The mixture was diluted with toluene into a mixture having an active ingredient content of 60 wt %.

To 100 parts of the mixture was added 50 parts of toluene. Further components (D) and (E) were added. Component (D) was 0.5 part of a toluene solution of 1,3-divinyl-1,1,3,3-tetramethyldisiloxane platinum(0) complex having a platinum content of 0.5 wt %. Component (E) was 0.5 part of the adhesion promoter of Preparation Example 1. In this way, a silicone PSA composition was prepared.

Example 21

A silicone PSA composition was prepared by further adding 2.0 parts of a polyorganohydrogensiloxane of the average compositional formula (f-2) as component (F) to the liquid composition of Example 20.

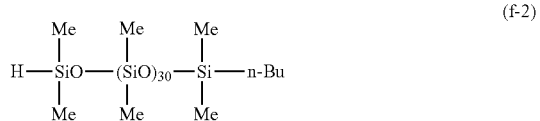

(f-2)

Comparative Example 1

A silicone PSA composition was prepared as in Example 1 except that the compound of Preparation Example 1 was omitted.

Comparative Example 2

A silicone PSA composition was prepared as in Example 2 aside from using 2,2-bis(4-allyloxyphenyl)propane instead of the compound of Preparation Example 1.

Comparative Example 3

A silicone PSA composition was prepared as in Comparative Example 2 aside from using 0.3 part of 2,2-bis(4-allyloxyphenyl)propane.

Comparative Example 4

A silicone PSA composition was prepared as in Example 2 aside from using the compound of Comparative Preparation Example 1 instead of the compound of Preparation Example 1.

Comparative Example 5

A silicone PSA composition was prepared as in Example 1 aside from using 2.0 parts of polyorganohydrogensiloxane of formula (f-2) instead of the compound of Preparation Example 1.

The silicone PSA compositions prepared above were evaluated for adhesion and bonding force (or adhesion strength) by the following tests.

Adhesion

To 100 parts of the mixture having an active ingredient content of 60 wt %, a curing catalyst and components (E) and (F), described above, were added. The ingredients were quickly stirred and mixed, obtaining a treating liquid. Using an applicator, the treating liquid was applied to a polyethylene terephthalate (PET) film of 23 μm thick and 25 mm wide and air dried in a dryer at 130° C. for 1 minute to form a PSA layer of 30 μm thick. The PSA article thus obtained was held static under certain conditions. Thereafter, the PSA layer was scratched with a sharp item (e.g., nail or cutter). The scratched layer was rubbed with the finger and rated according to the following criterion. The static holding conditions included four sets: room temperature for one day; 60° C./90% RH for one day; 85° C./85% RH for one day; and 60° C./90% RH for 7 days.

Evaluation Criterion

Good (○): PSA layer did not peel off substrate
Poor (X): PSA layer peeled off substrate Bonding Force To 100 parts of the mixture having an active ingredient content of 60 wt %, a curing catalyst and components (E) and (F), described above, were added. The ingredients were quickly stirred and mixed, obtaining a treating liquid. Using an applicator, the treating liquid was applied to a PET film of 23 μm thick and 25 mm wide and heat cured at 130° C. for 1 minute to form a PSA layer of 30 μm thick. The resulting PSA tape was attached to a glass plate and bonded thereto by moving a rubber-lined pressure roller of 2 kg weight on the tape twice back and forth. The glass plate having the PSA tape bonded thereto was held in a thermostat tank under each set of temperature, humidity and time, after which it was tested by a tensile tester. Measured was a force (in N/25 mm) required to peel the tape off the glass plate by pulling at a speed of 300 mm/min and an angle of 180°.

The results are shown in Tables 1 and 2.

TABLE 1

| | | | Adhesion | | | |
|---|---|---|---|---|---|---|
| Example | | Component (E) | Component (F) | RT/ 1 day | 60° C./ 90% RH/ 1 day | 85° C./ 85% RH/ 1 day | 60° C./ 90% RH/ 7 days |
| Example | 1 | Preparation Example 1 | nil | ○ | ○ | ○ | ○ |
| | 2 | Preparation Example 1 | nil | ○ | ○ | ○ | ○ |
| | 3 | Preparation Example 1 | nil | ○ | ○ | ○ | ○ |
| | 4 | Preparation Example 1 | nil | ○ | ○ | ○ | ○ |
| | 5 | Preparation Example 1 | nil | ○ | ○ | ○ | ○ |
| | 6 | Preparation Example 1 | nil | ○ | ○ | ○ | ○ |
| | 7 | Preparation Example 1 | nil | ○ | ○ | ○ | ○ |
| | 8 | Preparation Example 2 | nil | ○ | ○ | ○ | ○ |
| | 9 | Preparation Example 3 | nil | ○ | ○ | ○ | ○ |
| | 10 | Preparation Example 1 | formula (f-1) | ○ | ○ | ○ | ○ |
| | 11 | Preparation Example 1 | formula (f-2) | ○ | ○ | ○ | ○ |
| | 12 | Preparation Example 1 | formula (f-3) | ○ | ○ | ○ | ○ |
| | 13 | Preparation Example 1 | formula (f-4) | ○ | ○ | ○ | ○ |
| | 14 | Preparation Example 1 | formula (f-2) | ○ | ○ | ○ | ○ |
| | 15 | Preparation Example 1 | formula (f-2) | ○ | ○ | ○ | ○ |
| | 16 | Preparation Example 1 | nil | ○ | ○ | ○ | ○ |
| | 17 | Preparation Example 1 | formula (f-2) | ○ | ○ | ○ | ○ |
| | 18 | Preparation Example 1 | nil | ○ | ○ | ○ | ○ |

TABLE 1-continued

Adhesion

| Example | | Component (E) | Component (F) | RT/ 1 day | 60° C./ 90% RH/ 1 day | 85° C./ 85% RH/ 1 day | 60° C./ 90% RH/ 7 days |
|---|---|---|---|---|---|---|---|
| | 19 | Preparation Example 1 | formula (f-2) | ○ | ○ | ○ | ○ |
| | 20 | Preparation Example 1 | nil | ○ | ○ | ○ | ○ |
| | 21 | Preparation Example 1 | formula (f-2) | ○ | ○ | ○ | ○ |
| Comparative Example | 1 | nil | nil | X | X | X | X |
| | 2 | reactant for Preparation Example 1 | nil | ○ | X | X | X |
| | 3 | reactant for Preparation Example 1 | nil | ○ | X | X | X |
| | 4 | Comparative Preparation Example 1 | nil | ○ | X | X | X |
| | 5 | nil | formula (f-2) | X | X | X | X |

TABLE 2

Bonding force (N/25 mm)

| Example | | Component (E) | Component (F) | RT/ 1 day | 60° C./ 90% RH/ 1 day | 85° C./ 85% RH/ 1 day | 60° C./ 90% RH/ 7 days |
|---|---|---|---|---|---|---|---|
| Example | 1 | Preparation Example 1 | nil | 0.14 | 4.20 | 4.90 | 5.25 |
| | 2 | Preparation Example 1 | nil | 0.21 | 1.10 | 1.54 | 1.74 |
| | 3 | Preparation Example 1 | nil | 0.20 | 1.06 | 1.52 | 1.55 |
| | 4 | Preparation Example 1 | nil | 0.18 | 1.05 | 1.59 | 1.06 |
| | 5 | Preparation Example 1 | nil | 0.16 | 0.38 | 0.47 | 0.58 |
| | 6 | Preparation Example 1 | nil | 0.17 | 1.28 | 1.57 | 1.85 |
| | 7 | Preparation Example 1 | nil | 0.11 | 0.42 | 0.78 | 1.08 |
| | 8 | Preparation Example 2 | nil | 0.22 | 1.16 | 1.61 | 1.71 |
| | 9 | Preparation Example 3 | nil | 0.19 | 1.38 | 1.56 | 1.65 |
| | 10 | Preparation Example 1 | formula (f-1) | 0.09 | 0.69 | 0.74 | 0.63 |
| | 11 | Preparation Example 1 | formula (f-2) | 0.07 | 0.60 | 0.54 | 0.65 |
| | 12 | Preparation Example 1 | formula (f-3) | 0.08 | 0.69 | 0.59 | 0.92 |
| | 13 | Preparation Example 1 | formula (f-4) | 0.09 | 0.51 | 0.74 | 1.11 |
| | 14 | Preparation Example 1 | formula (f-2) | 0.10 | 0.54 | 0.64 | 1.14 |
| | 15 | Preparation Example 1 | formula (f-2) | 0.06 | 0.45 | 0.42 | 0.44 |
| | 16 | Preparation Example 1 | nil | 0.14 | 0.87 | 1.48 | 1.49 |
| | 17 | Preparation Example 1 | formula (f-2) | 0.10 | 0.32 | 0.52 | 0.55 |
| | 18 | Preparation Example 1 | nil | 0.61 | 3.46 | 4.61 | 4.72 |
| | 19 | Preparation Example 1 | formula (f-2) | 0.21 | 2.14 | 2.44 | 2.56 |
| | 20 | Preparation Example 1 | nil | 3.63 | 10.23 | 10.26 | 10.59 |
| | 21 | Preparation Example 1 | formula (f-2) | 1.77 | 5.10 | 4.39 | 6.26 |
| Comparative Example | 1 | nil | nil | 0.05 | 0.07 | 0.22 | 0.14 |
| | 2 | reactant for Preparation Example 1 | nil | 0.10 | transferred to glass | transferred to glass | transferred to glass |
| | 3 | reactant for Preparation Example 1 | nil | 0.07 | transferred to glass | transferred to glass | transferred to glass |
| | 4 | Comparative Preparation Example 1 | nil | 0.04 | 0.20 | transferred to glass | transferred to glass |
| | 5 | nil | formula (f-2) | 0.03 | 0.04 | 0.12 | 0.07 |

Examples 1 to 21 all manifested satisfactory substrate adhesion. The PSA layer develops satisfactory adhesion to the substrate because interaction occurs at the interface due to a pi stacking effect between π electrons in phenyl groups in component (E) and in the substrate. However, at the same time, the bonding force to glass increases with the lapse of time, because phenyl groups in component (E) also interact with silanol groups on the glass surface. Then a polyorganohydrogensiloxane having one Si—H group at a molecular end, as shown by average compositional formulae (f-1) to (f-4), is additionally used, for thereby preventing the bonding force to the adherend from increasing with the lapse of time. This is presumably because siloxane pendants are formed in the crosslinked network to improve a parting ability, which is effective for preventing the bonding force from increasing, as discussed previously.

Comparative Example 1 having no adhesion promoter added thereto failed in adhesion. When the compound of Comparative Preparation Example 1 was used, initial adhesion was ensured, but the maintenance of adhesion with time was unsatisfactory. Comparative Examples 2 and 3 using 2,2-bis(4-allyloxy-phenyl)propane, reactant for component (E) manifested unsatisfactory adhesion, presumably because the reactant has a low molecular weight so that interaction with the substrate functions only in part. It is presumed that the desired effect is exerted when the compound having a relatively high molecular weight as demonstrated in Preparation Examples 1 to 3 is used. In the measurement of bonding force, the PSA layer transferred to glass, indicating undercure. Component (F) was effective for preventing the bonding force from increasing with time, but not for improving adhesion when used alone.

Japanese Patent Application Nos. 2014-036872 and 2014-125456 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A silicone pressure-sensitive adhesive composition, comprising:
   (A) 100 to 40 parts by weight of an organopolysiloxane represented by the average compositional formula (1) and having at least two alkenyl-containing organic groups per molecule,

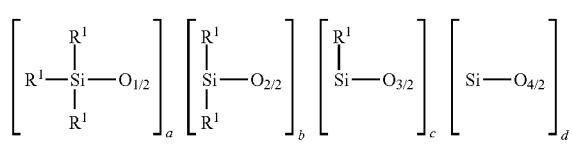

wherein $R^1$ is each independently a $C_1$-$C_{10}$ monovalent hydrocarbon group, at least two of $R^1$ containing a $C_2$-$C_{10}$ alkenyl-containing organic group, a is an integer of at least 2, b is an integer of at least 1, c is an integer of at least 0, d is an integer of at least 0, and $50 \leq a+b+c+d \leq 15,000$;
   (B) 60 to 0 parts by weight of a polyorganosiloxane comprising $R^2_3SiO_{1/2}$ units and $SiO_{4/2}$ units wherein $R^2$ is each independently a $C_1$-$C_{10}$ monovalent hydrocarbon group free of aliphatic unsaturation or a $C_2$-$C_6$ alkenyl group, in a molar ratio $R^2_3SiO_{1/2}/SiO_{4/2}$ of 0.5 to 1.0, wherein the total amount of components (A) and (B) is 100 parts by weight;
   (C) a polyorganohydrogensiloxane represented by the average compositional formula (2) and containing at least three Si—H groups per molecule, in an amount to provide 0.2 to 15 moles of Si—H groups per mole of alkenyl groups in components (A) and (B), $$R^3_e H_f SiO_{(4-e-f)/2} \quad (2)$$

wherein $R^3$ is each independently a substituted or unsubstituted $C_1$-$C_{10}$ monovalent hydrocarbon group, e and f are numbers in the range: $e>0$, $f>0$, and $0<e+f \leq 3$;
   (D) a platinum group metal base catalyst for curing by promoting hydrosilylation addition between alkenyl groups in components (A) and (B) and Si—H groups in component (C), in an amount to give 1 to 500 ppm of metal based on the total weight of components (A) to (C);
   (E) 0.01 to 10 parts by weight relative to the total weight of components (A) to (C) of a compound containing at least one recurring unit having the formula (3) and at least one Si—H group per molecule,

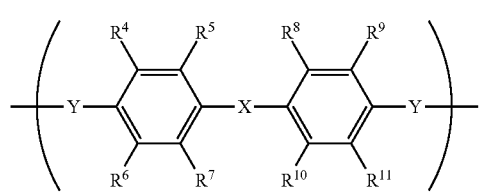

wherein $R^4$ to $R^{11}$ are each independently hydrogen, halogen, hydroxyl or a $C_1$-$C_6$ monovalent hydrocarbon group, X is selected from divalent organic groups having the formula (4):

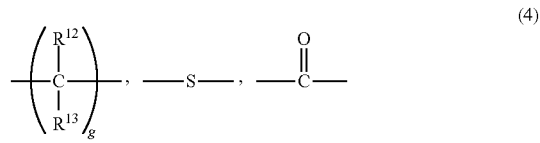

wherein $R^{12}$ and $R^{13}$ are each independently hydrogen, halogen, hydroxyl or a $C_1$-$C_6$ monovalent hydrocarbon group, and g is an integer of at least 1, and Y is each independently a $C_1$-$C_6$ divalent hydrocarbon group which may contain an ether moiety in its structure; and
   (F) 0.01 to 100 parts by weight relative to the total weight of components (A) to (C) of an organohydrogenpolysiloxane represented by the average compositional formula (5), exclusive of component (C),

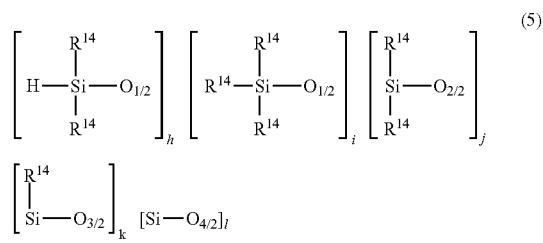

wherein $R^{14}$ is each independently a $C_1$-$C_{10}$ monovalent hydrocarbon group, h is 1, i is an integer of at least 1, j is an integer of at least 1, k and l each are an integer of at least 0, and $5 \leq h+i+j+k+l \leq 500$, and the organohydrogenpolysiloxane has only one Si—H group at a molecular end.

2. The composition of claim 1, further comprising (G) 0.01 to 5 parts by weight relative to the total weight of components (A) to (C) of a regulator.

3. The composition of claim 1 wherein component (E) is a compound obtained from hydrosilylation addition of (E1) an organic compound having the formula (6) and (E2) a compound having at least two Si—H groups per molecule in the presence of a catalyst,

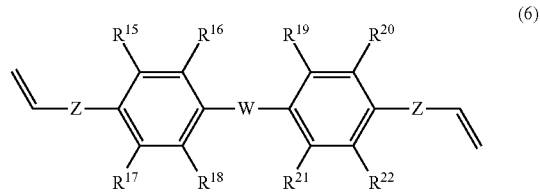

wherein $R^{15}$ to $R^{22}$ are each independently hydrogen, halogen, hydroxyl or a $C_1$-$C_6$ monovalent hydrocarbon group, W is a divalent organic group selected from the formula (7):

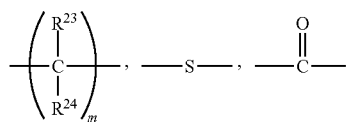 (7)

wherein $R^{23}$ and $R^{24}$ are each independently hydrogen, halogen, hydroxyl or a $C_1$-$C_6$ monovalent hydrocarbon group, and m is an integer of at least 1, and Z is each independently a $C_1$-$C_6$ hydrocarbon group which may contain an ether moiety in its structure.

4. A pressure-sensitive adhesive article comprising a substrate and a pressure-sensitive adhesive layer on at least one surface of the substrate, the pressure-sensitive adhesive layer being formed by coating the silicone pressure-sensitive adhesive composition of claim 1 onto at least one surface of the substrate and curing the composition.

5. The article of claim 4 wherein the substrate is a plastic film.

6. The composition of claim 1, wherein component (F) is selected from organohydrogenpolysiloxane represented by following formulae,

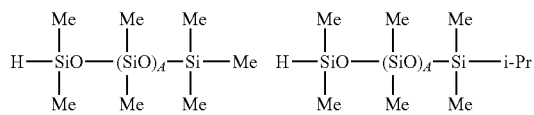

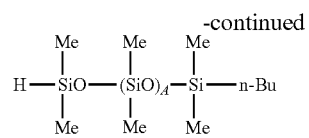

-continued

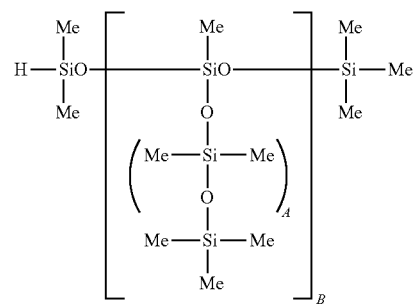

wherein i-Pr is isopropyl, n-Bu is normal butyl, Me is methyl group, A is a number of 4 to 300, and B is a number of 1 to 10.

7. The composition of claim 1, wherein the amount of component (A) is 90 to 40 parts by weight and the amount of component (B) is 60 to 10 parts by weight.

* * * * *